March 14, 1939.          H. RIST          2,150,783
SCREENING FOR ELECTRIC CABLES
Filed Aug. 25, 1936
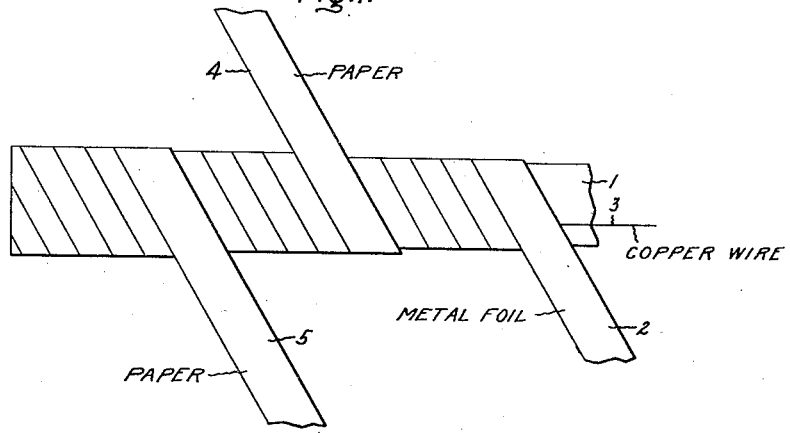
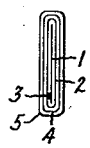
Inventor:
Hans Rist,
by Harry E. Dunham
His Attorney.

Patented Mar. 14, 1939

2,150,783

UNITED STATES PATENT OFFICE 2,150,783

SCREENING FOR ELECTRIC CABLES

Hans Rist, Johannisthal, Germany, assignor to General Electric Company, a corporation of New York Application August 25, 1936, Serial No. 97,829
In Germany September 9, 1935

6 Claims. (Cl. 174—108)

In telephone and communication cables screening is provided for the individual conductors by a four wire arrangement or by the use of a metallic strip wound around the insulation on the individual conductors. The metallic strip used is in the form of a metallized paper band or a metal foil which is wound spirally around the cable. When such an arrangement is used the metal strip, when wound spirally around the cable, is crumpled on the inner side due to the shorter radius and is stretched on the outer side of the strip. Thus the metallic strip lies in folds on its inner side and is stretched on the outer side. The effectiveness of the screen provided by such a strip is thus reduced by these folds.

An object of the invention is to provide a metallic strip which overcomes this objection. On a core of flexible material such as cable filling twine composed of twisted crepe paper is wound a metal foil or metallized paper with the metallized surface toward the cable filling twine and over this one or more insulating layers, for example paper bands, are wound and insulated like a cable conductor. The structure is then either pressed flat between two rollers or the cable filling twine is pressed flat before the metal foil or metallized paper is wound over it. To increase the conductivity of the metallized paper or metal foil or for bridging the adjacent turns in the event that any tears should exist in the metal foil a thin copper wire is arranged along the cable filling twine or it may be wound spirally about it. The metallic strip wound over the cable filling twine of crepe paper is very flexible and the danger of the tearing of the metal strip due to a tensile or compressive stress is very small. Also, due to the fact that the metal foil is wound spirally around the cable filling twine the bending or flexing of the cable will permit the adjacent turns of the metal strip to move relatively to each other thus further increasing the flexibility and reducing the danger of injury to the strip.

An example of a construction made in accordance with the invention is represented in the drawing in which Fig. 1 shows in a side view a metallic strip with the layers of material wound over the filling material and Fig. 2 is a cross sectional view of Fig. 1. I indicates a cable filling twine of twisted crepe paper over which is wound a metallized paper band or metal foil 2 and a thin copper wire 3 is arranged along the cable filling twine. Two paper bands 4 and 5 are wound over the metal foil 2.

What I claim as new and desire to secure by Letters Patent of the United States is:

1. A metallic strip for electrostatic screening in electric cables, said strip comprising a core of non-conducting flexible material, a metallized foil wound over the core and an insulating layer provided over the metal foil.

2. A metallic strip for electrostatic screening in electric cables comprising a core of twisted crepe paper, a metal foil wound spirally over the core and a layer of insulating material provided over the metal foil.

3. A metallic strip for electrostatic screening in electric cables, said strip comprising a core of fibrous flexible material, a strip of metal foil wound spirally on the core, and a layer of insulating material provided over the metal foil, said strip being pressed flat.

4. A metallic strip for electrostatic screening in electric cables, said strip comprising a core of non-conducting flexible material, a metal foil wound spirally over the core, and a plurality of paper tapes wound spirally over the metal foil.

5. A metallic strip for eletrostatic screening in electric cables, said strip comprising a core of fibrous flexible material pressed flat, a metal foil wound spirally over the core, and a plurality of paper tapes wound spirally over the metal foil.

6. A metallic strip for electrostatic screening in electric cables, said strip comprising a core of fibrous flexible material, a wire paralleling said fibrous material, a metal foil wound spirally over said core and wire, said wire making contact with the spiral laps of said foil, and a layer of insulating material provided over the metal foil.

HANS RIST.